(12) United States Patent
Yoshikawa

(10) Patent No.: US 8,634,124 B2
(45) Date of Patent: Jan. 21, 2014

(54) OPTICAL APPARATUS AND IMAGING APPARATUS

(75) Inventor: Koichi Yoshikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 406 days.

(21) Appl. No.: 13/125,447

(22) PCT Filed: Sep. 17, 2010

(86) PCT No.: PCT/JP2010/066224
§ 371 (c)(1),
(2), (4) Date: Apr. 21, 2011

(87) PCT Pub. No.: WO2011/037089
PCT Pub. Date: Mar. 31, 2011

(65) Prior Publication Data
US 2011/0199531 A1  Aug. 18, 2011

(30) Foreign Application Priority Data

Sep. 28, 2009 (JP) .................................. 2009-223183

(51) Int. Cl.
*G02B 26/08* (2006.01)
(52) U.S. Cl.
USPC ....................................................... 359/211.2
(58) Field of Classification Search
USPC ........................................... 359/209.1–211.6
See application file for complete search history.

(56) References Cited

U.S. PATENT DOCUMENTS 7,336,407 B1 * 2/2008 Adams et al. .............. 359/211.1

FOREIGN PATENT DOCUMENTS

| JP | 60 027278 | 2/1985 |
| JP | 63 169614 | 7/1988 |
| JP | 4 330888 | 11/1992 |
| JP | 6 250099 | 9/1994 |
| JP | 9 171204 | 6/1997 |
| JP | 10 254053 | 9/1998 |
| JP | 2000 184265 | 6/2000 |
| JP | 2004 312777 | 11/2004 |

OTHER PUBLICATIONS

International Search Report issued Oct. 19, 2010 in PCT/JP10/066224 filed Sep. 17, 2010.

* cited by examiner

*Primary Examiner* — Jennifer L. Doak
(74) *Attorney, Agent, or Firm* — Oblon, Spivak, McClelland, Maier & Neustadt, L.L.P.

(57) ABSTRACT

Provided is an optical apparatus including a filter (102) that includes a first surface (105) intersecting a rotation axis at a predetermined angle and a second surface (106) orthogonal to the rotation axis and rotates around the rotation axis, a filter (110) that is arranged adjacent to the filter (102), includes a third surface (115) and a fourth surface (116) in a spatial relationship of point-symmetry to the first surface (105) and the second surface (106) about a point on the rotation axis between the filters, and rotates in an opposite direction of the filter (102) around the rotation axis.

17 Claims, 17 Drawing Sheets

OPTICAL APPARATUS AND IMAGING APPARATUS

TECHNICAL FIELD

The present invention relates to an optical apparatus and an imaging apparatus.

BACKGROUND ART

As described, for example, in Patent Literature 1 below, a technology to acquire an image with less blurring by changing an optic-axial angle by moving a correcting lens to cancel out image blurring to make a camera movement correction has been known.

CITATION LIST

Patent Literature

Patent Literature 1: JP 9-171204 (A)

SUMMARY OF INVENTION

Technical Problem

There are many examples of a blurring correcting mechanism in which image blurring is canceled out by displacing a portion of lenses (correcting optical system) among taking lenses in a direction perpendicular to the optical axis to change the optic-axial angle. In such a case, the correcting optical system needs to make a linear motion. In both cases of blurring when a camera is held in a hand and when a camera is mounted on a support or the like, the blurring speed tends to be large near the center of vibration amplitude and small near the maximum amplitude. Thus, it is necessary for the correcting optical system that makes a linear motion to accordingly maximize the movement speed of the optical system near the optical axis, rapidly decelerate the movement speed as the maximum amplitude where the maximum blurring correction amount arises comes closer, set the movement speed to 0 in the maximum blurring correction position, and then reverse the moving direction.

However, the operation described above becomes a burden on an actuator. Particularly when the vibration frequency increases, a delay in operation speed arises, making it difficult for a blurring correcting mechanism to follow and there arising an issue that a desired blurring correcting operation may not be realized. The blurring correcting mechanism is contained in a taking lens in most structures and there is an issue for a lens-interchanging camera such as a single-lens reflex camera that it is difficult to use a blurring correcting function by lenses other than lenses with the blurring correcting mechanism.

Further, to easily acquire a panorama image, images are captured while panning a camera. In such a case, an image is captured after stopping the camera and then the camera is moved again in a panning direction, causing an issue that a photographing time will be longer. Moreover, the camera is repeatedly moved in the panning direction and stopped, which makes it necessary to increase the size of a drive mechanism (motor), inviting an issue of more complex apparatuses and higher costs.

The present invention has been made in view of the above-mentioned issue, and aims to provide a novel and improved optical apparatus and imaging apparatus capable of making a blurring correction with a simple configuration.

Solution to Problem

According to an aspect of the present invention in order to achieve the above-mentioned object, there is provided an optical apparatus including: a first optical element that includes a first surface intersecting a rotation axis at a predetermined angle and a second surface orthogonal to the rotation axis and rotates around the rotation axis; and a second optical element that is arranged adjacent to the first optical element, includes a third surface and a fourth surface in a spatial relationship of point-symmetry to the first surface and the second surface about a point on the rotation axis between the first optical element and the second optical element, respectively, and rotates around the rotation axis in an opposite direction of the first optical element.

The first surface may be formed of two surfaces whose orientation of inclination with respect to the rotation axis is reversed in a boundary surface including the rotation axis, and the fourth surface in the spatial relationship of point-symmetry to the first surface about the point on the rotation axis may be formed of two surfaces in the spatial relationship of point-symmetry to the two surfaces of the first surface about the point on the rotation axis.

The first and second optical elements may make a reciprocating motion about the rotation axis within a range of a predetermined rotation angle.

The optical apparatus may be arranged on an object side of a taking lens to form an object image in a state in which an optical axis of the taking lens and the rotation axis are matched to allow a light beam that has passed through the first and second optical elements to enter the taking lens.

The optical apparatus may be arranged on an object side of a taking lens to form an object image in a state in which an optical axis of the taking lens and the rotation axis are offset to allow a light beam that has passed through the first and second optical elements to enter the taking lens.

The optical apparatus may be arranged on an object side of a taking lens to form an object image and a period in which the taking lens captures an image for each frame while moving and a rotation period of the first and second optical elements may be synchronized.

The optical apparatus may be arranged on an object side of a taking lens to form an object image and a period in which the taking lens captures an image for each frame while rotating an orientation of an optical axis and a rotation period of the first and second optical elements may be synchronized.

The optical apparatus may be arranged on an object side of a taking lens to form an object image, a period in which the taking lens captures an image for each frame while rotating an orientation of an optical axis and a rotation period of the first and second optical elements may be synchronized, and an amount of change of the orientation of the optical axis for each frame of the taking lens may match a light beam deflection amount when the first and second optical elements rotate by 180°.

The optical apparatus may be arranged in front of a taking lens on an object side to form an object image, behind the taking lens on an image forming surface side, or inside the taking lens.

According to another aspect of the present invention in order to achieve the above-mentioned object, there is provided an imaging apparatus including: an optical element including: a first optical element that includes a first surface intersecting a rotation axis at a predetermined angle and a second surface orthogonal to the rotation axis and rotates around the rotation axis; and a second optical element that is arranged adjacent to the first optical element, includes a third surface and a fourth surface in a spatial relationship of point-symmetry to the first surface and the second surface about a point on the rotation axis between the first optical element and the second optical element, respectively, and rotates around the rotation axis in an opposite direction of the first optical element; a taking lens to form an object image by a light beam that has passed through the optical element; and an image sensor having an imaging surface on which the object image is formed by the taking lens.

The first surface of the first optical element may be formed of two surfaces whose orientation of inclination with respect to the rotation axis is reversed in a boundary surface including the rotation axis, and the fourth surface in the spatial relationship of point-symmetry to the first surface about the point on the rotation axis may be formed of two surfaces in the spatial relationship of point-symmetry to the two surfaces of the first surface about the point on the rotation axis.

The first and second optical elements may make a reciprocating motion about the rotation axis within a range of a predetermined rotation angle.

An optical axis of the taking lens and the rotation axis may be matched.

An optical axis of the taking lens and the rotation axis may be offset.

An image of an object may be captured for each frame while moving and a period in which the image is captured for the each frame and a rotation period of the first and second optical elements may be synchronized.

An image of an object may be captured for each frame while rotating an orientation of an optical axis of the taking lens, and a period in which the image is captured for the each frame and a rotation period of the first and second optical elements may be synchronized.

An image of an object may be captured for each frame while rotating an orientation of an optical axis of the taking lens and an amount of change of the orientation of the optical axis for each frame may match a light beam deflection amount when the first and second optical elements rotate by 180°.

Advantageous Effects of Invention

According to the present invention, a novel and improved optical apparatus and imaging apparatus capable of making a blurring correction with a simple configuration can be provided.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Note that the description will be made in the following order.

Figure 1:
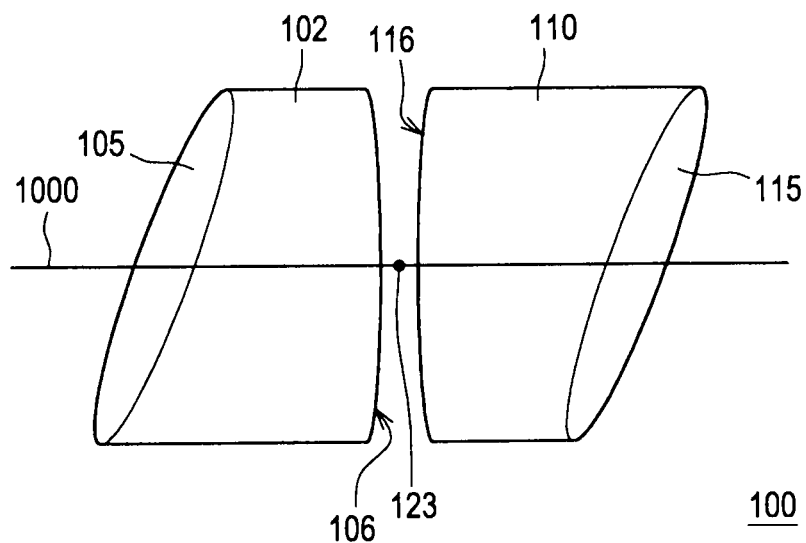
FIG. 1 is a schematic diagram showing an optical unit according to an embodiment of the present embodiment.

1. First embodiment (configuration example of blurring corrections by rotation filters)
2. Second embodiment (configuration example in which the optical axis deflection angle is in one direction)
3. Third embodiment (configuration example in which rotation filters are driven to reciprocate)
4. Configuration example in which filters are caused to rotate 1. First Embodiment FIG. 1 is a schematic diagram showing an optical unit 100 according to an embodiment of the present invention. As shown in FIG. 1, the optical unit 100 includes glass filters 102 and 110. An outer circumference of each of the filters 102 and 110 is a cylindrical surface having an optical axis 1000 (Z axis) as a center axis.

Figure 2:
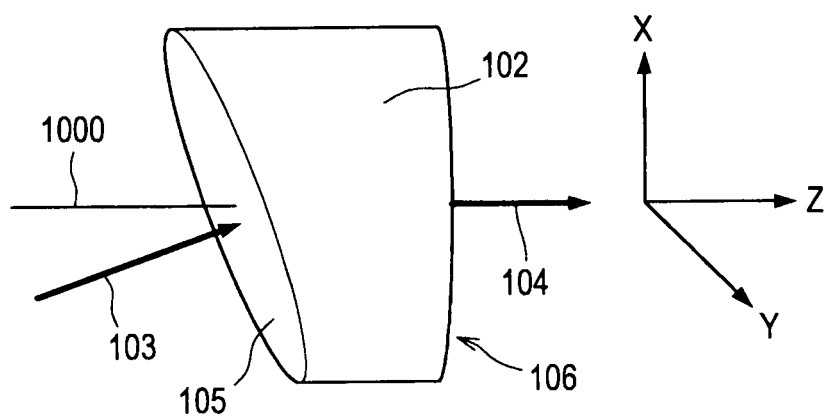
FIG. 2 is a schematic diagram showing a filter of the optical unit.

FIG. 2 is a schematic diagram showing the filter 102. Refraction of light incident on the filter 102 will be described based on FIG. 2. A light beam 103 incident from the left side in FIG. 2 is refracted by the filter 102 and is emitted from the right side of the filter 2 as a light beam 104 along the optical axis 1000.

A surface 105 of the filter 102 where the light beam 103 is incident is a plane obtained by obliquely cutting a cylinder. A surface 106 from which the light beam 104 is emitted is a surface perpendicular to the optical axis 1000. X, Y, and Z directions are defined as shown in FIG. 2 and a normal of the surface 105 is assumed to be in an XZ plane. When the filter 102 is cut by the XZ plane, a cutting plane line of the surface 105 and that of the surface 106 form a wedge shape, instead of being parallel.

On the other hand, when the filter 102 is cut by a YZ plane, the cutting plane line of the surface 105 and that of the surface 106 become parallel. Thus, while the light beam 103 incident on the surface 105 is refracted to the X direction (direction along the XZ plane), the light beam 103 travels in a straight line without being refracted in the Y direction (direction along YZ plane). If the filter 102 is rotated around the optical axis 1000, the direction of refraction of the light beam can freely be adjusted in all directions.

In FIG. 1, the filter 102 and the filter 110 have the same shape and are made of the same material. As shown in FIG. 1, the filter 110 is arranged so as to be point-symmetric to the filter 102 about a point 123 on the optical axis 1000 to configure the optical unit 100 according to the present embodiment. The filter 110 has a surface 115 obtained by obliquely cutting a cylinder and a surface 116 perpendicular to the optical axis 1000.

The optical unit 100 according to the present embodiment allows a light beam emitted from the filter 102 to enter the filter 110 and to be refracted again by the filter 110. If as described above, the filter 102 is rotated around the optical axis 1000, the direction of refraction of the light beam can freely be adjusted in all directions around the optical axis 1000. Similarly, if the filter 110 is rotated around the optical axis 1000, the direction of refraction of the light beam can freely be adjusted in all directions around the optical axis 1000. The optical unit 100 according to the present embodiment uses this nature and causes an incident light beam to refract in a specific direction only by mutually rotating the filter 102 and the filter 110.

Figure 3:
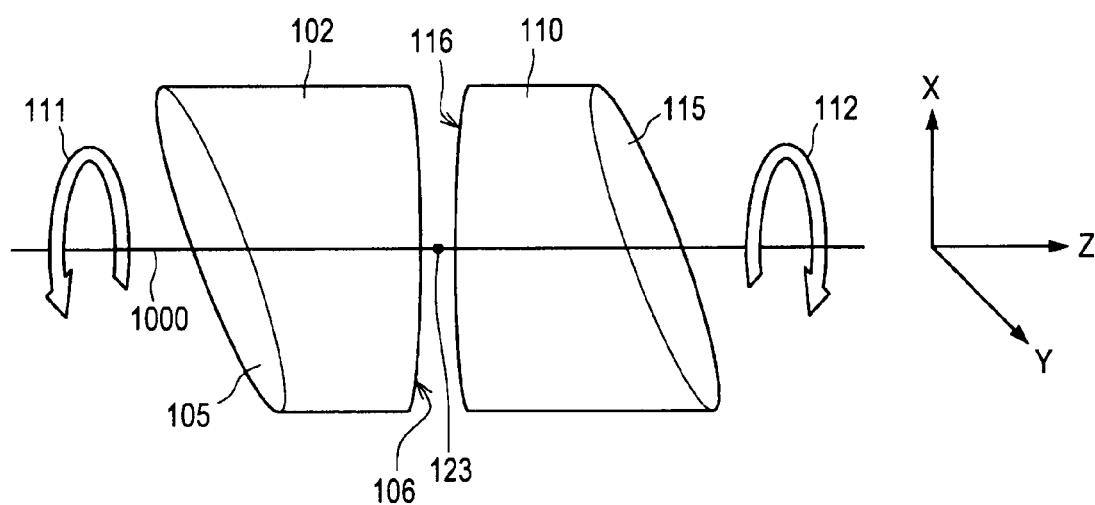
FIG. 3 is a schematic diagram showing how the filter rotates.

FIG. 3 is a schematic diagram showing how the filter 102 and the filter 110 rotate. FIG. 3 shows an initial state to be a reference, the normal of the surface 105 is present on the XZ plane, and the normal of the surface 115 is also present on the XZ plane. In this state, the surface 105 of the filter 102 and the surface 115 of the filter 110 are parallel.

In the optical unit 100 according to the present embodiment, the filter 102 and the filter 110 are rotated around the optical axis 1000 in the opposite directions at the same speed from the state shown in FIG. 1 as the initial state. As shown in FIG. 1, the filter 102 rotates in an arrow 111 direction (clockwise when viewed from the minus side (object side) of the Z axis) and the filter 110 rotates in an arrow 112 direction (counterclockwise when viewed from the minus side (object side) of the Z axis).

Figure 4:
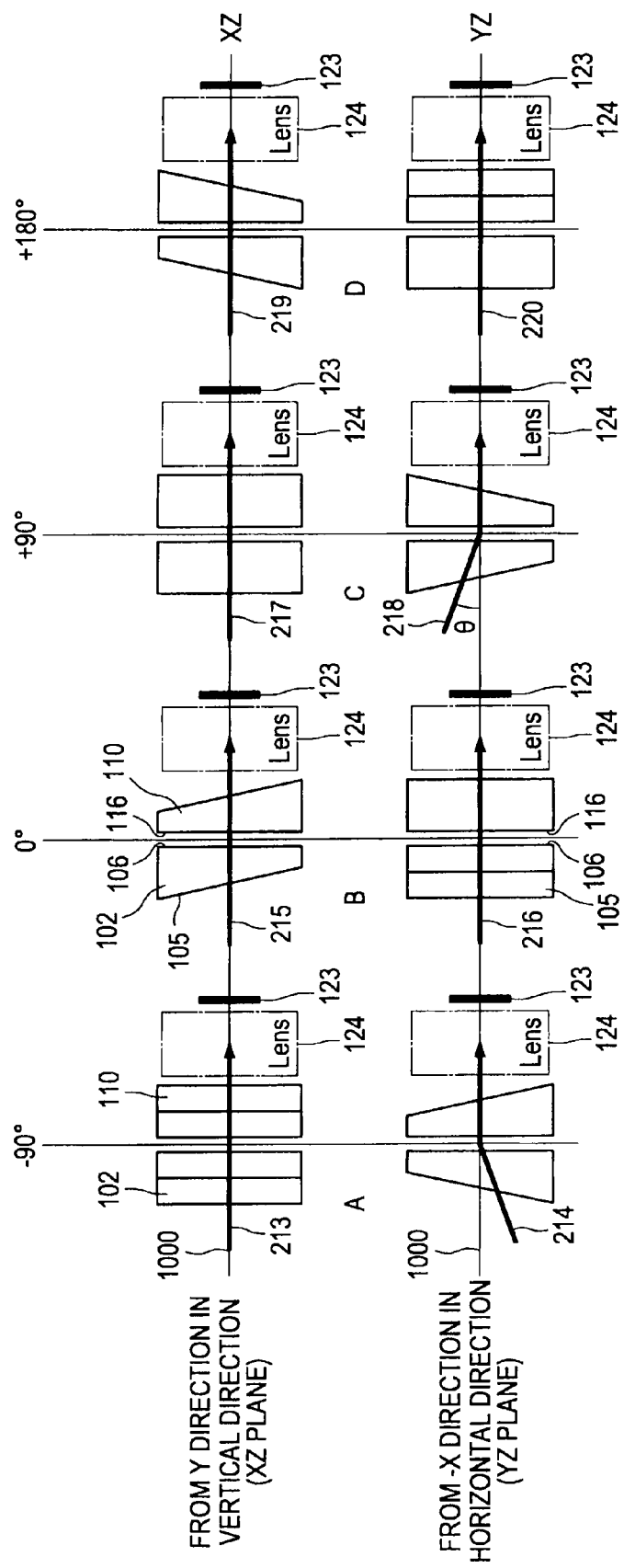
FIG. 4 is a schematic diagram showing an outline of how a light beam is refracted when an initial state in FIG. 3 is defined as 0° and a filter 102 and a filter 110 are positioned in a rotation angle of each of −90°, +90°, and +180°.

FIG. 4 gives an outline of how a light beam is refracted when the initial state in FIG. 3 is defined as 0° and the filter 102 and the filter 110 are positioned in the rotation angle of each of −90°, +90°, and +180°. The vertical direction shown in FIG. 4 shows a state in which the optical unit 100 is viewed from the plus side of the Y-axis direction in FIG. 1 and shows how the light beam is refracted on the XZ plane. The horizontal direction shown in FIG. 4 shows a state in which the optical unit 100 is viewed from the minus side of the X-axis direction in FIG. 1 and shows how the light beam is refracted on the YZ plane. For the rotation angles of −90°, +90°, and +180°, the rotation direction (the arrow 111 direction in FIG. 3) of the filter 102 is defined as the plus direction.

The filter 102 and the filter 110 are arranged on the front side (object side) of a taking lens 124. The taking lens 124 is a lens that forms an object image on an imaging surface (image forming surface) of an image sensor 123 such as a CCD and CMOS and includes one or a plurality of optical lenses. As shown in FIG. 4, the taking lens 124 is arranged in such a way that the optical axis of the taking lens 124 matches the optical axis 1000 of the optical unit 100. The optical unit 100 may be arranged inside the taking lens 124, in which case the optical unit 100 is arranged among the plurality of optical lenses of the taking lens 124. Alternatively, the optical unit 100 may be arranged between the taking lens 124 and the image forming surface of the image sensor 123. In all cases, an optic-axial deflection angle described later can be caused so that a blurring correction can be made.

If, as shown in FIG. 4, the lens rotation angle is 0°, the normals of the surface 105 and the surface 115 are on the XZ plane in the horizontal direction (on the YZ plane) and thus, a light beam is not refracted on the YZ plane. The light beam reaching the center of the image sensor 123 enters the optical unit 100 from the direction of the optical axis 1000 to become a light beam 216 that has passed through the taking lens 124.

When the lens rotation angle is 0°, in the vertical direction (on the XZ plane), the light beam is slightly refracted by the filter 102 and the filter 110 on the XZ plane, but as described later, the amount of refraction is very small. Thus, also in the vertical direction, the light beam reaching the center of the image sensor 123 enters the optical unit 100 in parallel with the optical axis 1000 to become a light beam 215 that has passed through the taking lens 124.

When the lens rotation angle is +90°, the normals of the surface 105 and the surface 115 are on the YZ plane and thus, a light beam is refracted by the filter 102 and the filter 110 as illustrated in FIG. 4 in the horizontal direction (on the YZ plane). The light beam reaching the center of the image sensor 123 enters the filter 102 at an angle θ with respect to the optical axis 1000 to become a light beam 218 that has passed through the taking lens 124. When the lens rotation angle is +90°, in the vertical direction (on the XZ plane), the normals of the surface 105 and the surface 115 are on the YZ plane and thus, a light beam is not refracted on the XZ plane. The light beam reaching the center of the image sensor 123 enters the optical unit 100 from the direction of the optical axis 1000 to become a light beam 217 that has passed through the taking lens 124.

When the lens rotation angle is +180°, in the horizontal direction (on the YZ plane), the normals of the surface 105 and the surface 115 are on the XZ plane and thus, a light beam is not refracted on the YZ plane. The light beam reaching the center of the image sensor 123 enters the optical unit 100 from the direction of the optical axis 1000 to become a light beam 220 that has passed through the taking lens 124. When the lens rotation angle is +180°, the configuration is slightly refracted by the filter 102 and the filter 110 in the vertical direction (on the XZ plane), but as described later, the amount of refraction is very small. Thus, also in the vertical direction, the light beam reaching the center of the image sensor 123 becomes a light beam 219 that is incident in parallel with the optical axis 1000.

When the lens rotation angle is −90°, the normals of the surface 105 and the surface 115 are on the YZ plane and thus, a light beam is refracted by the filter 102 and the filter 110 as illustrated in FIG. 4 in the horizontal direction (on the YZ plane). The light beam reaching the center of the image sensor 123 enters the filter 102 at an angle θ with respect to the optical axis to become a light beam 214 that has passed through the taking lens 124. When the lens rotation angle is −90°, in the vertical direction (on the XZ plane), the normals of the surface 105 and the surface 115 are on the YZ plane and thus, a light beam is not refracted on the XZ plane. The light beam reaching the center of the image sensor 123 enters the optical unit 100 from the direction of the optical axis 1000 to become a light beam 213 that has passed through the taking lens 124.

Figure 5:
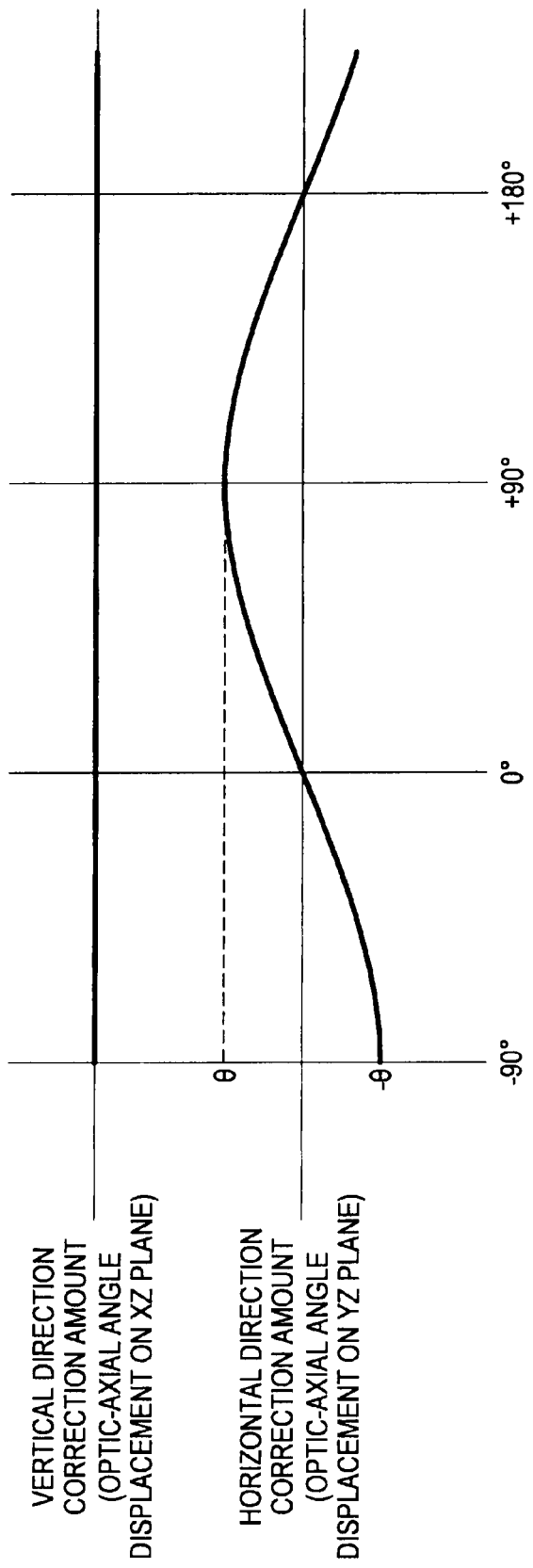
FIG. 5 is a schematic diagram showing optic-axial angle displacements in a horizontal direction and a vertical direction in accordance with the lens rotation angle (−90°, 0°, +90°, and +180°).

FIG. 5 shows optic-axial angle displacements in the horizontal direction and the vertical direction in accordance with the lens rotation angle (−90°, 0°, +90°, and +180°). The optic-axial angle displacement is the orientation of the optical axis of the taking lens 124 displaced by the optical unit 100. As described with reference to FIG. 4, for example, in the horizontal direction of +90°, the light beam 218 that has entered the filter 102 at an angle θ with respect to the optical axis 1000 reaches the center of the image sensor 123. Thus, if only the taking lens 124 is used without using the optical unit 100, the same effect is gained as when the orientation of the taking lens 124 is inclined by the angle θ. It is desirable that a blurring correction be made by using the optic-axial angle displacement as a blurring angle correction amount.

The optic-axial angle displacement will be described based on FIG. 5. As described with reference to FIG. 4, a light beam that has entered the optical unit 100 is not refracted on the XZ plane at any lens rotation angle of −90°, 0°, +90°, and +180° in the vertical direction (on the XZ plane). Thus, as shown in FIG. 5, the optic-axial angle displacement in the vertical direction is typically 0 regardless of the rotation angle.

On the other hand, in the horizontal direction (on the YZ plane), as shown in FIG. 5, the optic-axial angle displacement draws sine curve with the rotation of the filter 102 and the filter 110. Thus, optic-axial angle displacement is 0 at 0° and 180° and takes the minimum value (−θ) at −90° and the maximum value (θ) at +90°

Thus, according to the optical unit 100 in the present embodiment, the displacement of the optical axis occurs only on the YZ plane. Therefore, as illustrated in the horizontal figure in FIG. 5, the orientation of the optical axis can be changed only on the YZ plane by varying the orientation of the optical axis in accordance with the relative rotation of the filter 102 and the filter 110. Using this, when the orientation of an optical system including the taking lens 124 and the optical unit 100 changes on the YZ plane, movement of an object on the image sensor 123 due to movement of the optical system can be canceled out by changing the orientation of the optical axis in the opposite direction of the movement direction, which can be applied to a movement correction.

Figure 6:
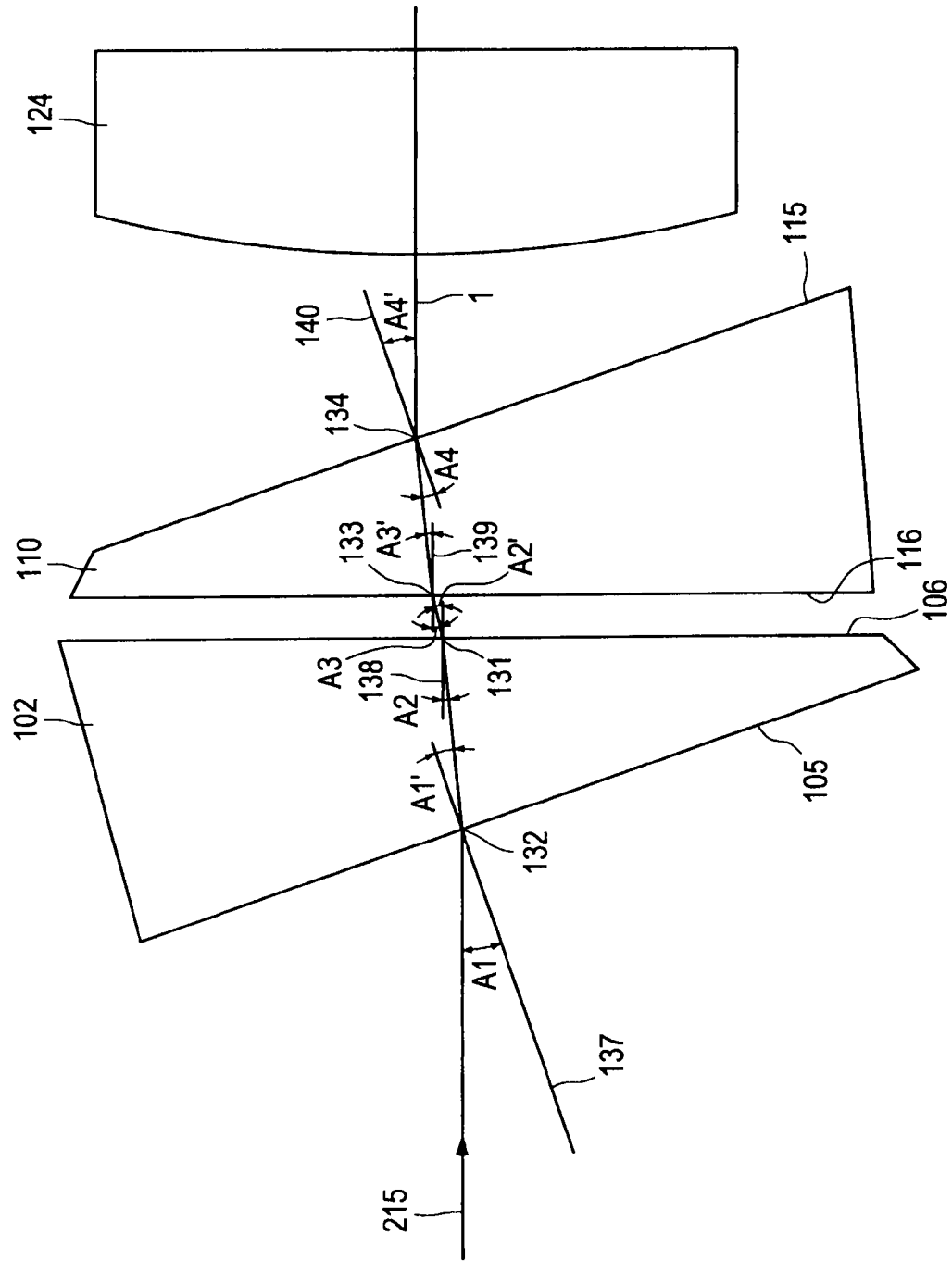
FIG. 6 is a schematic diagram illustrating why the light beam is not refracted on a large scale in the vertical direction (XZ plane) when the lens rotation angle is 0° and in the vertical direction (XZ plane) when the lens rotation angle is 180°.

As described above, a light beam is slightly refracted in the vertical direction (on the XZ plane) at the lens rotation angle of 0° and the vertical direction (on the XZ plane) at the lens rotation angle of 180°, but is not refracted on a large scale. This point will be described based on FIG. 6. In FIG. 6, the light beam 215 of an object space incident from an object reaches the center of the image sensor 123 after passing, as described above, on the optical axis of the taking lens 124. The light beam 215 traveling in the direction of the arrow enters the filter 102 at a point 132 on the surface 105 of the filter 102 at an incidence angle A1 and travels through the filter 102 after being refracted according to the Snell's law to an emission angle A1'. Then, the light beam 215 is emitted from a point 131 on the surface 106 of the filter 102 at an incidence angle A2 and an emission angle A2'. Then, the light beam 215 enters the filter 110 at a point 133 on the surface 116 at an incidence angle A3 and an emission angle A3'. Then, the light beam 215 is emitted from a point 134 on the surface 115 of the filter 110 at an incidence angle A4 and an emission angle A4'.

In FIG. 6, a straight line 137 is a normal of the plane 105, a straight line 138 a normal of the plane 105, a straight line 139 a normal of the plane 116, and a straight line 140 a normal of the plane 115. The plane 106 and the plane 116 are parallel and perpendicular to the optical axis of the taking lens 124. The plane 105 and the plane 115 are parallel and the refractive index of the filter 102 and that of the filter 110 are the same. Thus, A2'=A3, A2=A3', and A1'=A4 hold and thus, A1=A4' holds. The normal 137 and the normal 140 are parallel and thus, the light beam 215 and taking lens 124 become parallel. Though a slight optical axis parallel shift (shift in a direction perpendicular to the optical axis) may arise between the light beam 215 and the optical axis of the taking lens 124, but an image shift due to the optical axis parallel shift is smaller than an image shift due to a change in optic-axial angle. Particularly, when a relatively distant view such as a landscape is taken, an influence of the optical axis parallel shift is small.

Figure 7:
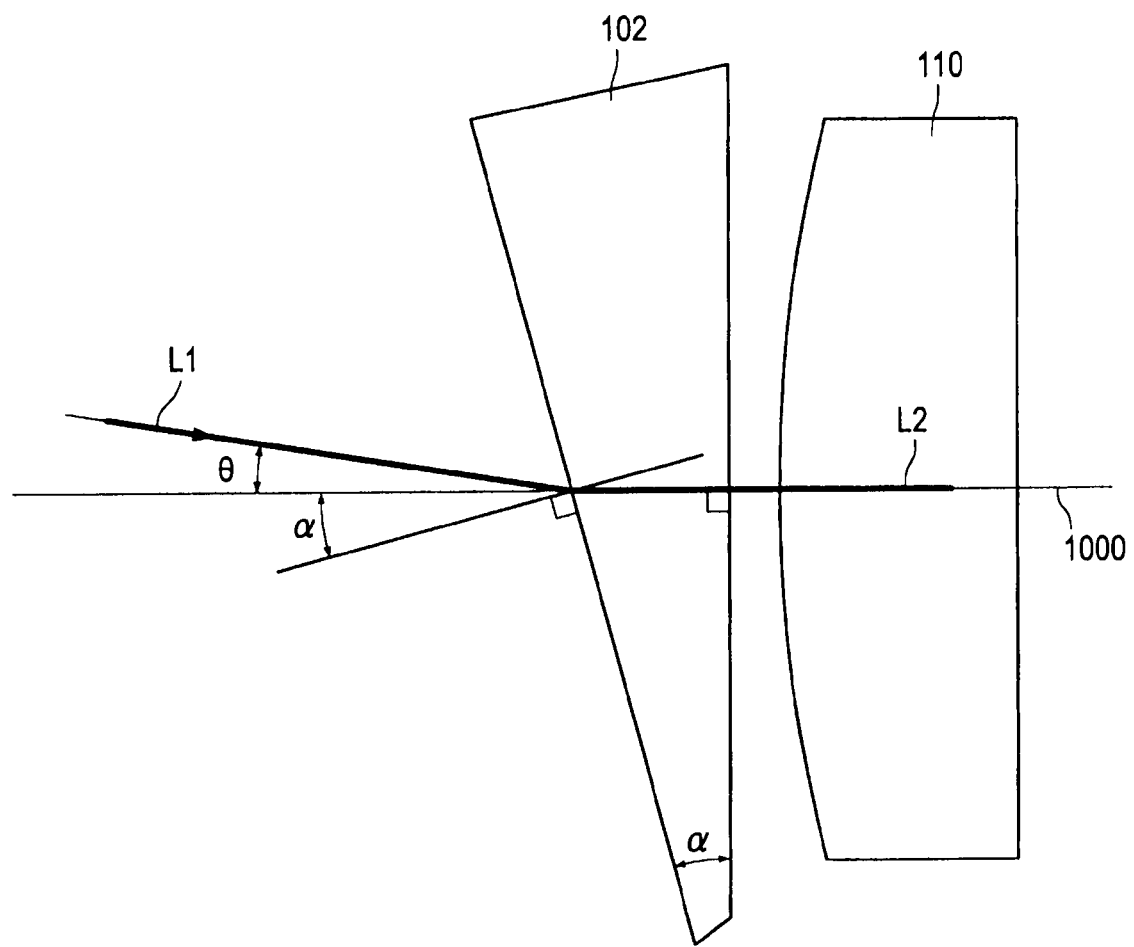
FIG. 7 is a schematic diagram showing an example in which the filter is attached before a taking lens.

Next, the principle when a light beam is curved in the horizontal direction (on the YZ plane) or the like at the lens rotation angle of +90° will be described based on FIG. 7. FIG. 7 shows a case in which only the filter 102 is set up before the taking lens 124. A light beam L1 enters the filter 102 at an angle θ with respect to the optical axis 1000 and travels on the optical axis of the taking lens 124 before reaching the center of the image sensor 123. If the vertical angle of the filter 102 is α and the refractive index thereof is n, the following equation holds thanks to the Snell's law, where n is the refractive index of the filter 102.

$$1*\sin(\theta+\alpha)=n*\sin \alpha$$

If θ+α is a sufficiently small value, θ+α=n*α holds and thus, θ=α(n−1) is obtained. If, for example, n=1.5 and α is displaced by ±4°, the light beam deflection angle θ becomes 2°. Therefore, at +90° or −90° in the horizontal direction in FIG. 4, if the sum of the vertical angle of the filter 102 and that of the filter 110 is α, the light beam deflection angle is given by θ=α(n−1).

Figure 8:
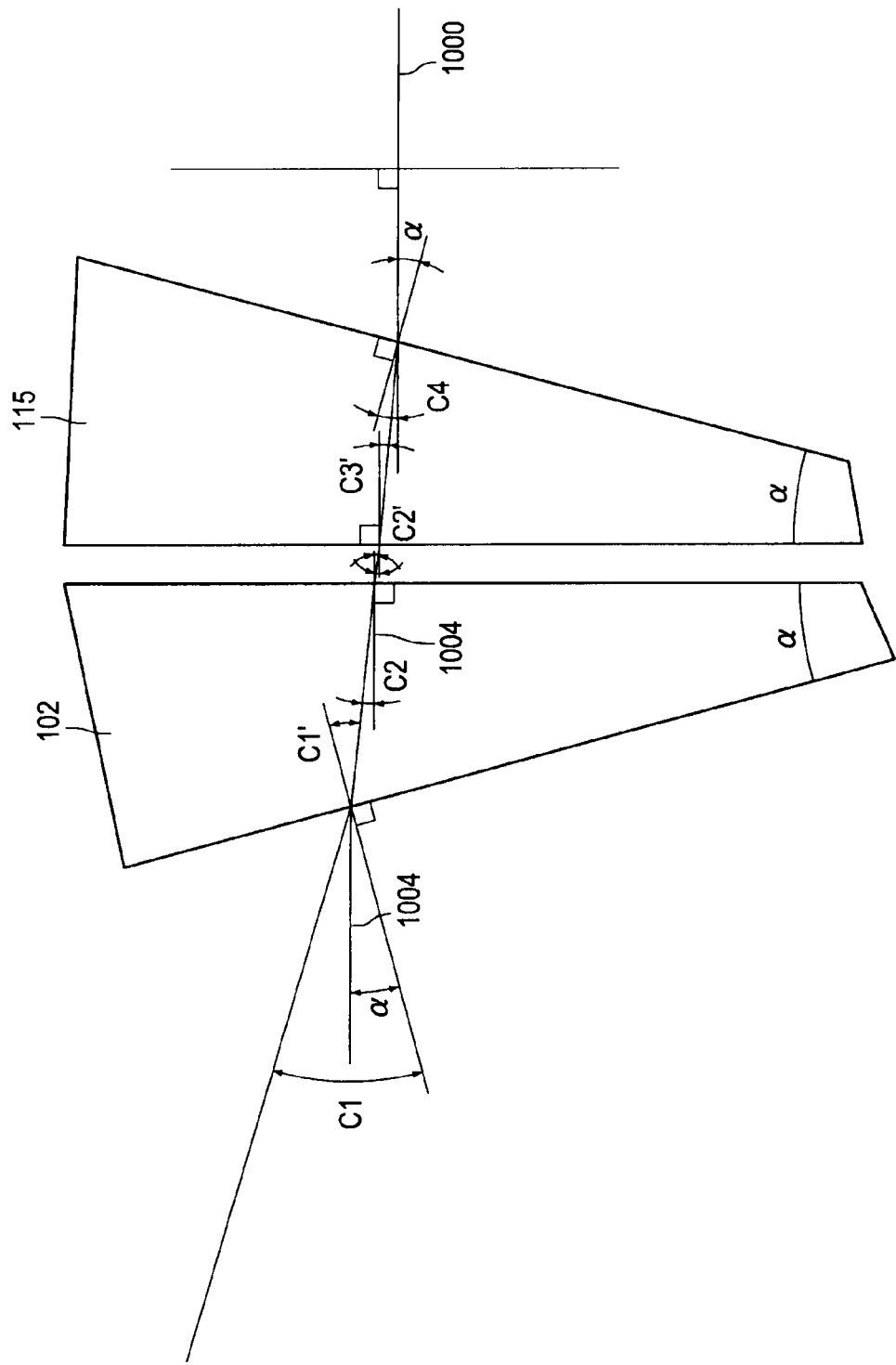
FIG. 8 is a schematic diagram illustrating relationships of a light beam deflection angle θ, a filter vertical angle α, and a filter refractive index n when the filters are attached on top of another.

If the filter 102 and the filter 110 are overlapped, the light beam deflection angle θ becomes twice the light beam deflection angle in FIG. 7. FIG. 8 is a schematic diagram illustrating relationships of the light beam deflection angle θ, the filter vertical angle α, and the filter refractive index n when the filter 102 and the filter 110 are overlapped.

Like in FIG. 7, light is assumed to travel from left to right. A straight line 1004 is a straight line parallel to the optical axis 1000. The following equations hold thanks to the Snell's law:

$$1*\sin C1=n*\sin C1' \quad (1)$$

$$n*\sin C2=1*\sin C2' \quad (2)$$

$$1*\sin C2=n*\sin C3' \quad (3)$$

$$n*\sin C4=1*\sin \alpha \quad (4)$$

From the equations (2) and (3), the following equation holds:

$$n*\sin C2=n*\sin C3'$$

Thus, C2 and C3' are equal to or less than 90° and therefore, C2=C3' is obtained.
Also, C1'−α=C2=C3' and
α−C4=C2=C3' holds and thus, C1'−α=α−C4 is obtained
The equation (1) is changed to $$\sin C1=n*\sin(2*\alpha-C4) \text{ and}$$

if the angle is sufficiently small, $$C1 = n*(2*\alpha - C4) \quad (5)$$

is obtained.

From the equation (4), $\sin C4 = 1/n * \sin \alpha$ is obtained and if the angle is sufficiently small, $$C4 = \alpha/n \quad (6)$$

is obtained

From the equations (5) and (6), $$C1 = 2*n*\alpha - \alpha$$

is obtained and thus, the deflection angle $\theta = C1 - \alpha$
$\theta = 2\alpha(n-1)$
is obtained. If $n=1.5$, $\theta = \alpha$ is obtained.

At the lens rotation angle of 0° and 180° in the horizontal direction and at the lens rotation angle of −90° and +90° in the vertical direction in FIG. 4, contour lines of the surface 105 of the filter 102 and the surface 115 of the filter 110 with respect to a surface perpendicular to the optical axis becomes perpendicular to the optical axis and thus, the light beam deflection angle θ becomes 0.

Figure 9:
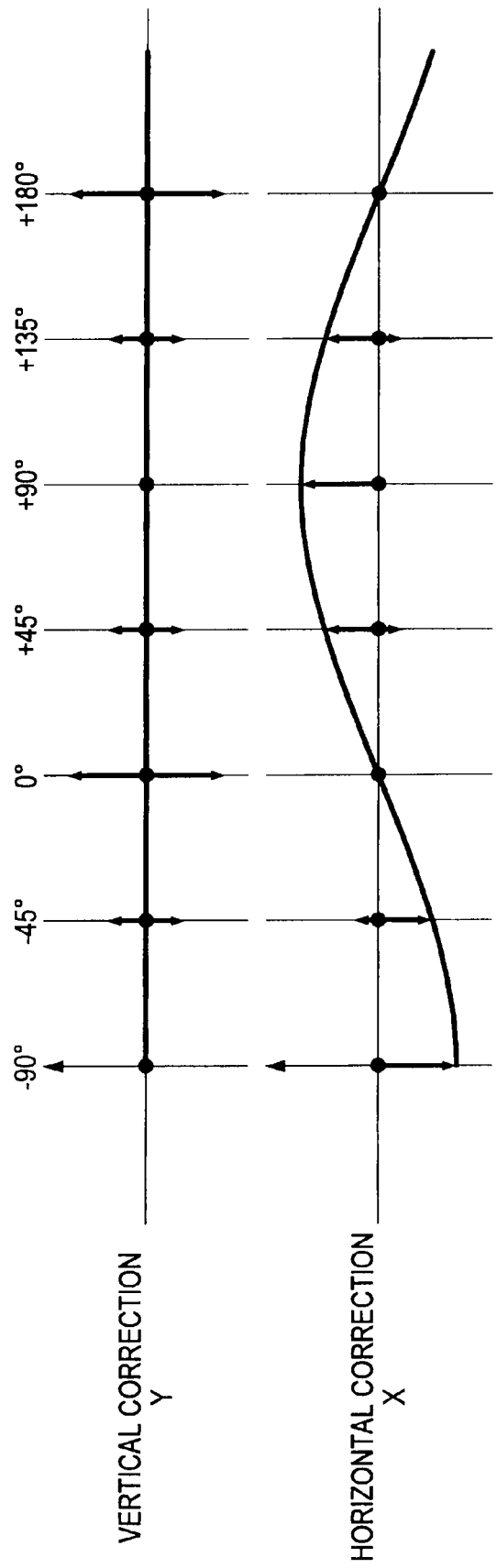
FIG. 9 is a schematic diagram showing power of a surface of the filter to refract the light beam in each of the vertical direction (XZ plane) and the horizontal direction (YZ plane) by arrow vectors.

Next, the light beam deflection angle will be further described based on FIG. 9. FIG. 9 shows power of the surface 105 and the surface 115 to refract the light beam in each of the vertical direction (XZ plane) and the horizontal direction (YZ plane) by arrow vectors (components on the XZ plane and the YZ plane of a light beam deflection vector). The amount of refraction of a light beam by the surface 105 and the surface 115 is determined by the inclination of the surface 105 and the surface 115 on the XZ plane and the YZ plane, respectively.

At −45° in the vertical (Y) direction, the surface 105 of the filter 102 and the surface 115 of the filter 110 have inclinations having the same magnitude (if contour lines of the surface 105 with respect to a surface perpendicular to the optical axis is drawn, the interval of the contour lines on the XZ plane) and in opposite directions. In other words, when power of refracting a light beam is considered, the surface 105 of the filter 102 and the surface 115 of the filter 110 have vectors in the opposite directions and the same scalars so that power to bend the optical axis in the Y direction is canceled out and the light beam deflection angle θ in the vertical (Y) direction becomes 0. This also applies to +45° in the vertical Y direction and in addition, the light beam deflection angle θ becomes 0 at any angle in the vertical direction.

On the other hand, at −45° in the horizontal X direction, power to bend a light beam caused by the filter 102 and that of the filter 110 have vectors in the opposite directions and different scalar quantities and thus, power to bend the light beam in a negative direction remains, causing a negative light beam deflection angle. At +45° or +90° in the horizontal X direction, power to bend a light beam caused by the filter 102 and that of the filter 110 have vectors in the opposite directions and different scalar quantities and thus, power to bend the light beam in a positive direction remains, causing a positive light beam deflection angle.

Figure 10:
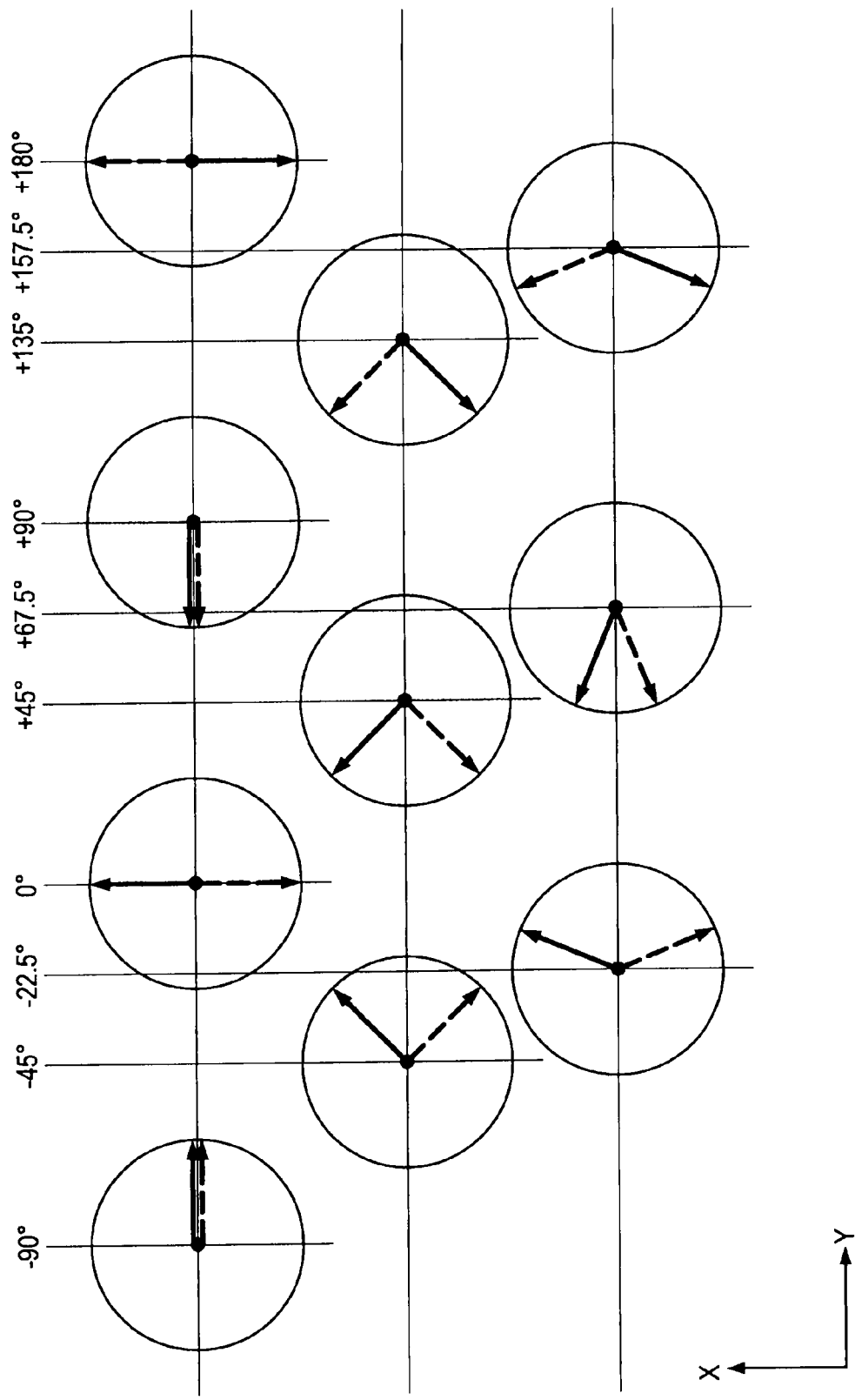
FIG. 10 is a schematic diagram illustrating an optical axis deflection angle in detail.

The light beam deflection angle will be described still in more detail based on FIG. 10. FIG. 10 shows power of the filter 102 and the filter 110 corresponding to the lens rotation angle to refract a light beam as light beam deflection vectors. In FIG. 10, a light beam deflection vector of the filter 102 is shown as a solid line arrow and a light beam deflection vector of the filter 110 as a broken line arrow and each vector indicates the direction in which the light beam is refracted. FIG. 10 shows a state when viewed from the plus direction of the Z axis and with the rotation of the filter 102, the solid line arrow, which is a light beam deflection vector of the filter 102, rotates counterclockwise and makes a turn with 360°. Therefore, a light beam deflection vector of solid line positioned at 12 of a clock at 0° makes a turn by rotating counterclockwise on paper with 360°.

On the other hand, with the rotation of the filter 110, the broken line arrow, which is a light beam deflection vector of the filter 110, rotates clockwise and makes a turn with 360°. Therefore, with the rotation of the filter 110, a light beam deflection vector of broken line positioned at 6 of a clock at 0° makes a turn by rotating clockwise on paper with 360°.

Therefore, as is evident from FIG. 10, a total defection vector, which is the sum of the two vectors, cancels out all the time when viewed from the Y direction (on the XZ plane) and when viewed from the X direction (on the YZ plane), on the other hand, components on the YZ plane are added to each other. Accordingly, in each of the vertical direction and the horizontal direction, characteristics shown in FIG. 5 are obtained. If a filter rotation angle (the direction of 12 of a clock is set as a reference 0 and the rotation direction of the filter 102 is defined as the plus direction) is β and maximum deflection angles of the filters 102 and 110 are respectively L, a total deflection angle γ in the horizontal direction can be expressed by Formula (2) below:

$$\gamma = 2L * \cos(\beta + \pi/2) \quad (2)$$

Figure 11:
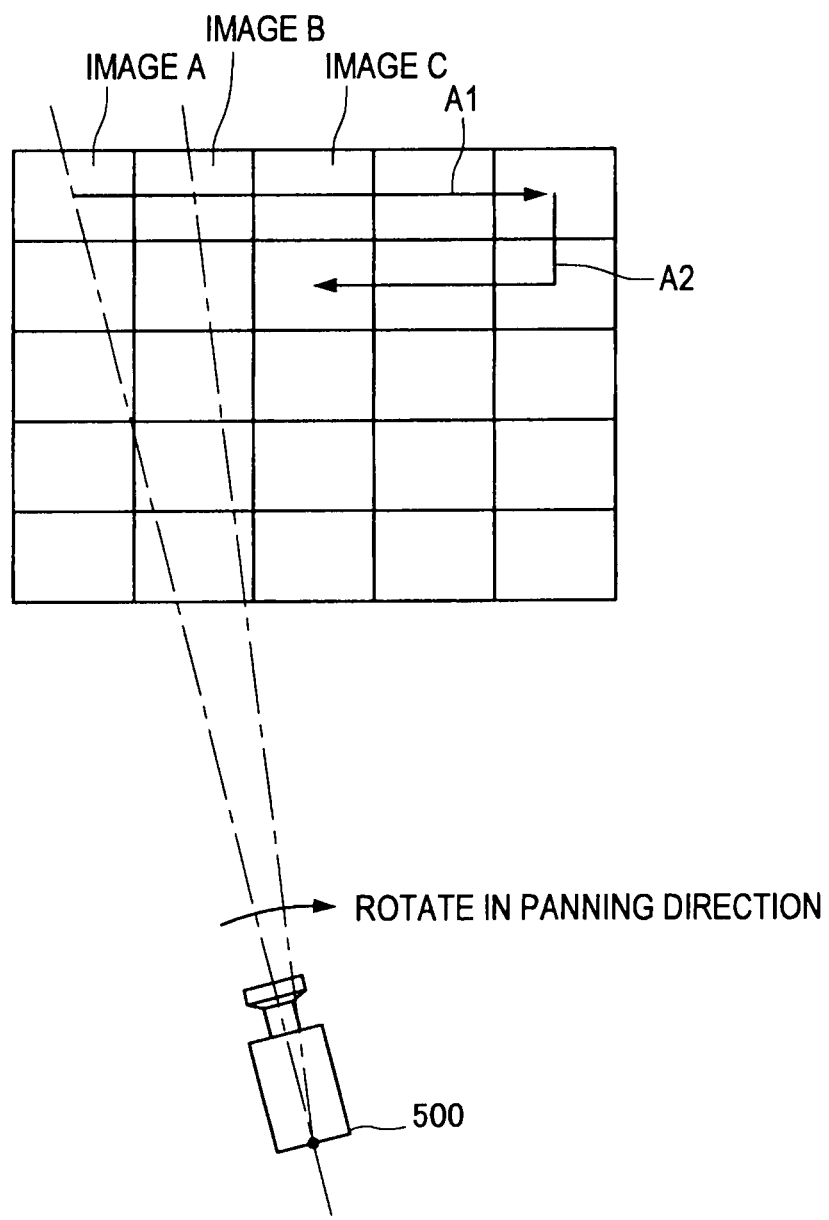
FIG. 11 is a schematic diagram showing how a panorama image is captured using the optical unit according to the present embodiment.

FIG. 11 is a schematic diagram showing how panorama images are captured using the optical unit 100 according to the present embodiment. As shown in FIG. 11, an image is acquired by the image sensor 123 while moving a camera 500, in which the optical unit 100, the taking lens 124, and the image sensor 123 are integrally formed, in a panning direction.

To acquire panorama images without blurring, images are captured while panning without stopping the camera 500. The frame rate of the camera 500 is defined as C frames/s. Then, the camera is panned in such a way that a moving angle in 1/C s becomes θ1. If the optical axis deflection angle displacement while the filter rotation angel changes from −90° to +90° is θ1 and the displacement is caused in the opposite direction of the panning direction, the displacement angle of the camera 500 is canceled out by the optical axis deflection angle. Thus, by clicking the shutter near the center position of each of images A, B, and C shown in FIG. 11 while panning the camera 500, panorama images without blurring can successively be obtained. After the image A, image B, image C, ... successively are captured while panning the camera in the direction of an arrow A1, a panorama photo can be formed by synthesizing the images. Thus, according to the configuration of the present embodiment, the images A, B, C, ... can successively be captured without stopping the camera 500 by rotating the filter 102 and the filter 110 in synchronization with the rotation of the camera 500. Therefore, there is no need to stop the camera 500 for each image so that the time necessary to capture panorama images can significantly be reduced. Accordingly, for example, by successively capturing images in a wide range using a telecamera, applications such as monitoring by acquiring panorama images of a distant region in a short time can be considered.

Moreover, there is no need to stop the camera 500 for each image and therefore, there is no need to use a large motor so that the system can be configured simply and power consumption can be reduced.

It is difficult to make a movement correction between the filter rotation angle +90° and −90° because an optical axis displacement occurs in the same direction as the panning direction of the camera 500. Thus, camera frames corresponding to the filter rotation angle +90° to −90° are not used for panorama images and panorama images are generated by overlapping images obtained from the filter rotation angle −90° to +90°. Then, if, as shown in FIG. 11, the camera is panned in the opposite direction (arrow A2 direction), the filter rotation direction is not changed, camera frames corresponding to the filter rotation angle −90° to +90° are not used for panorama images, and panorama images are generated by overlapping images obtained from the filter rotation angle +90° to −90°.

As described above, blurring attendant on movement of the camera 500 can be corrected by rotating the optical unit 100 in synchronization with the movement of the camera 500. Therefore, images without blurring can be acquired when, for example, rectangular panorama images are captured by reciprocating the camera 500.

According to the present embodiment, as described above, a blurring correction is enabled by a rotational motion of the filters 102 and 110 in the same direction and a high-frequency vibration can also be addressed. Moreover, the vibration waveform is close to a sine wave and thus, a reliable blurring correction can be made easily. Further, a blurring correction can be made by rotating the filters 102 and 110 and thus, a movable mechanism can be made simpler and also durability can be improved and costs can be cut down. Particularly for a shift lens system, which is the mainstream of blurring correction, it is necessary to cause a lens to linearly reciprocate to make a blurring correction and control of high-frequency vibration is difficult to exercise, but according to the present embodiment, a blurring correction corresponding to high-frequency vibration can be made.

Also when panorama images are captured while continuing to pan the camera 500, a blurring correction can be made by rotating the filters 102 and 110 so that 360° panorama images can also be captured.

When a wide-range image obtained by pasting images after a camera is installed in a mobile unit such as a vehicle and airplane and mainly a landscape in a direction perpendicular to the traveling direction is taken, high-speed movement photographing can be enabled by applying a panorama photographing technology according to the present embodiment to realize a shortened photographing time.

Moreover, the optical unit 100 as a blurring correcting unit can be attached before an existing taking lens so that a blurring correcting function can be added to various lenses.

2. Second Embodiment

Next, the second embodiment of the present invention will be described. The second embodiment is a technique particularly suitable for successively capturing 360° panorama images or continuing to capture images of an outside landscape from a mobile unit such as a vehicle when images are captured while panning in the same direction without stopping the camera 500 to easily acquire panorama images.

Figure 12:
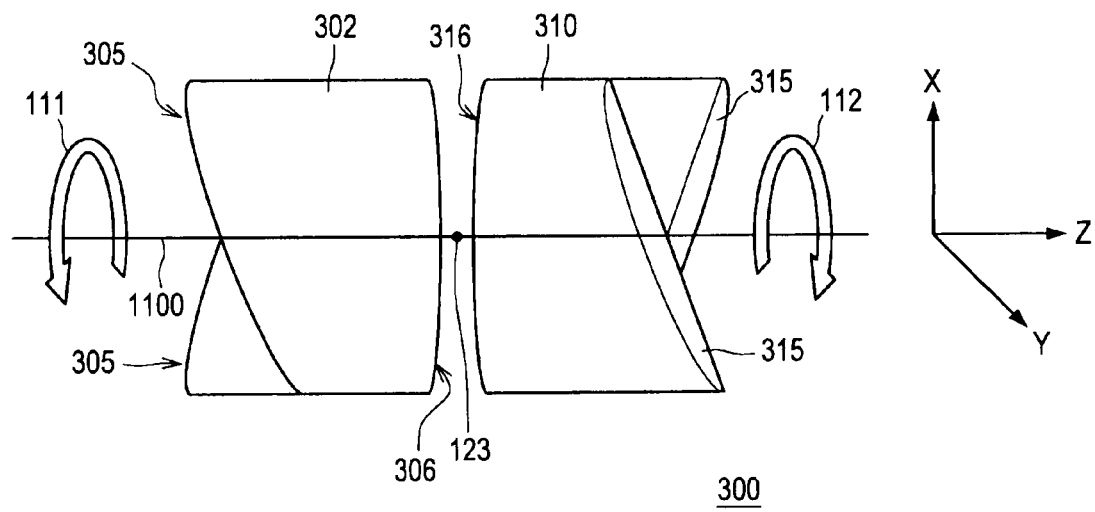
FIG. 12 is a schematic diagram showing the configuration of an optical unit according to a second embodiment.
Figure 13:
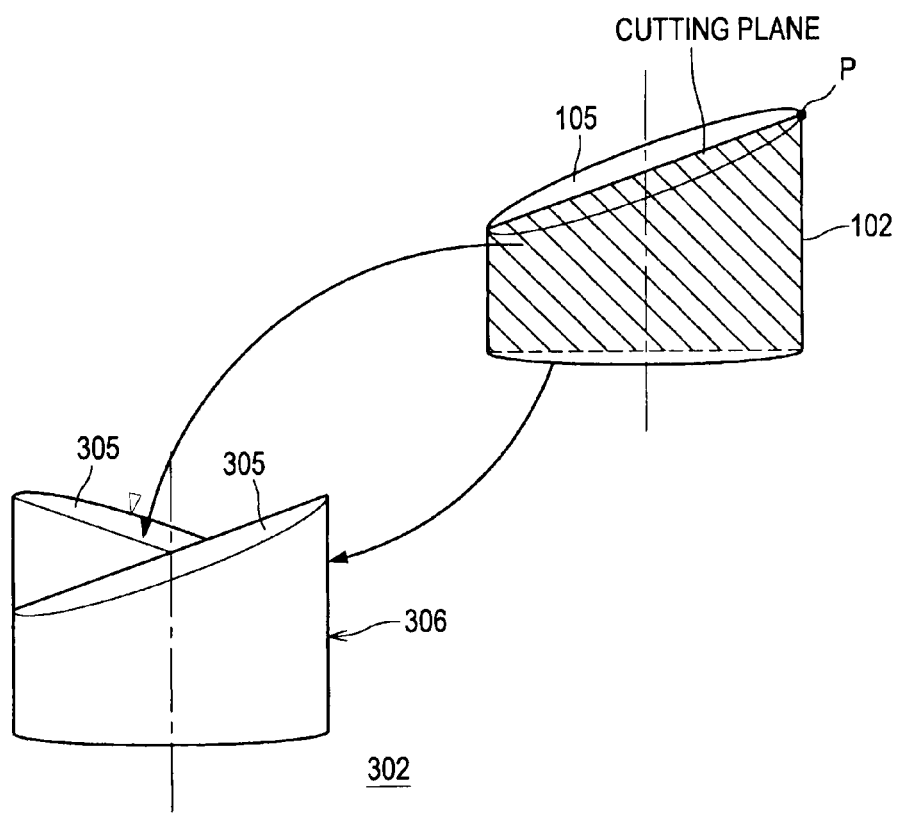
FIG. 13 is a schematic diagram showing the configuration of a filter according to the second embodiment.

FIG. 12 is a schematic diagram showing the configuration of an optical unit 300 according to the second embodiment. The optical unit 300 according to the second embodiment is formed by overlapping a filter 302 and a filter 310. FIG. 13 is a schematic diagram showing the configuration of the filter 302. The filter 302 is obtained by cutting the filter 102 in the first embodiment by a plane passing through the center axis of the filter 102 and passing through a highest point P of the surface 105 with respect to a surface perpendicular to the center axis and two cut-off portions of one side are prepared to join the two portions at the cutting plane after mirror-image inversion with respect to the center axis. Thus, a first surface (surface on the object side) of the filter 302 is formed of two surfaces 305 having different orientations of inclination. Like the surface 106 in the first embodiment, a second surface 306 of the filter 302 is a surface perpendicular to the center axis. The filter 310 has the same shape as that of the filter 302 and is arranged, like in the first embodiment, in a position point-symmetric to the filter 302 about the point 123 on a center axis 1100 to configure the optical unit 300 according to the present embodiment. Like the first embodiment, the filter 302 rotates in the arrow 111 direction and the filter 350 rotates in the opposite direction indicated by the arrow 112 at the same speed.

Figure 14:
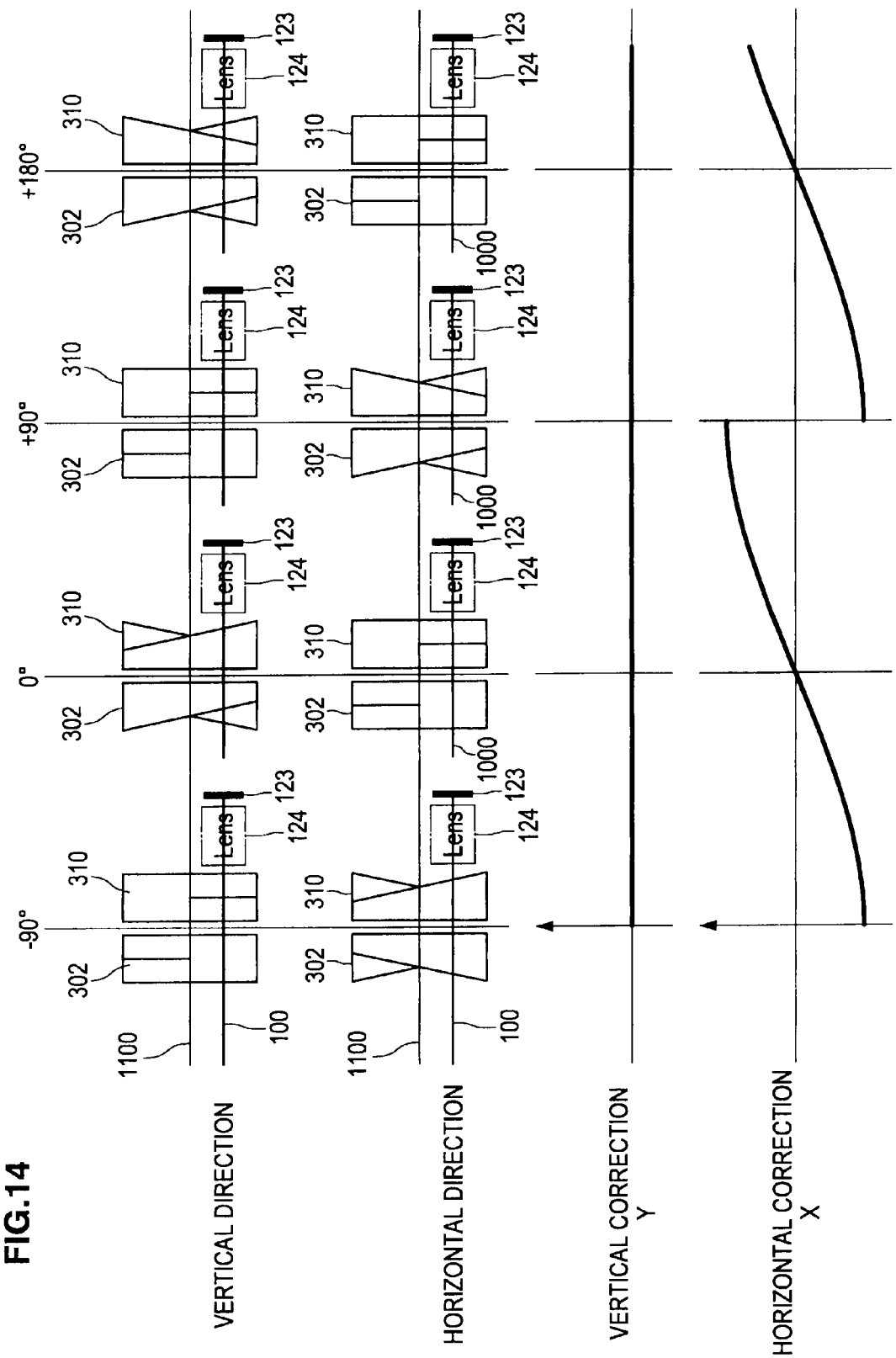
FIG. 14 is a schematic diagram showing an outline of how the light beam is refracted when the initial state of the filter rotation angle is defined as 0° and the filters are rotated by an angle of −90°, +90°, and +180°.

FIG. 14 shows an outline of how a light beam is refracted when the initial state of the filter rotation angle is defined as 0° and the filter 302 and the filters 310 are rotated by the angle of −90°, +90°, and +180°. As shown in FIG. 14, the filter rotation axis 1100 and the optical axis 1000 of the taking lens 124 are parallel in the second embodiment, but both do not match and are offset against each other by a predetermined distance.

Like in FIG. 4, the vertical direction shown in FIG. 14 shows a state (sectional view on the XZ plane) in which the optical unit 300 is viewed from the plus side of the Y-axis direction in FIG. 12 and shows how the light beam is refracted on the XZ plane. The horizontal direction shown in FIG. 14 shows a state (sectional view on the YZ plane) in which the optical unit 300 is viewed from the minus side of the X-axis direction in FIG. 12 and shows how the light beam is refracted on the YZ plane.

The basic principle of refraction of a light beam by the optical unit 300 is basically the same as that of the optical unit 100 in the first embodiment. In the optical unit 300 according to the second embodiment, when the joint surface of the filter 302 passes through the optical axis of the taking lens 124 with rotation of the filter 302, the surface through which a light beam incident on the taking lens 124 passes is switched between the two surfaces 305. At the same time, when the joint surface of the filter 310 passes through the optical axis of the taking lens 124 with rotation of the filter 310, the surface through which the light beam incident on the taking lens 124 passes is switched between the two surfaces 315.

The switching is configured to occur in the positions of −90° and +90°. Thus, in the positions of −90° and +90°, the same effect as a case when the filter 102 and the filter 110 of the optical filter 100 in the first embodiment are rotated by 180° instantaneously can be achieved.

While the filter rotation axis 1100 and the optical axis 1000 of the taking lens 124 are offset in the second embodiment, the spatial relationship (light beam deflection vector) between the surface 305 and the surface 315 attendant on rotation of the filters 302 and 310 is similar to that between the surface 105 and the surface 115 in the first embodiment. Therefore, the filter rotation axis and the optical axis of the taking lens 124 may also be offset in the first embodiment.

As shown in FIG. 14, in the vertical direction (XZ plane), the first surface 305 of the filter 302 and a second surface 316 of the filter 310 through which a light beam incident on the taking lens 124 passes have inclinations in the opposite directions and the equal Y-direction component or are parallel. Thus, vectors thereof are in the opposite directions and scalars thereof are the same and therefore, power to bend the optical axis in the Y direction cancels out and the light beam deflection angle θ becomes 0.

In the horizontal direction, on the other hand, based on the principle described in the first embodiment, the optical axis is refracted in accordance with the rotation angle of the filter 302 and the filter 310. The difference from the first embodiment is that the light beam deflection angle θ changes from the maximum plus displacement to the minimum minus displacement at +90°. Similarly at −90°, the light beam deflection angle θ changes from the maximum plus displacement to the minimum minus displacement. Thus, as shown in FIG. 14, the light beam deflection angle θ in the horizontal direction draws "saw-tooth type" characteristics in which the light beam deflection angle θ takes the minimum value at −90° and increases till +90° and when +90° is exceeded, the light beam deflection angle θ takes the minimum value again and increases till −90° (270°).

When taking a panorama photo like in FIG. 11, if the frame rate of the camera 500 is C frames/s, the camera 500 is panned in such a way that a moving angle in 1/C s becomes θ1. If the light beam deflection angle displacement while the filter rotation angel changes from −90° to +90° is θ1 and the displacement is caused in the opposite direction of the panning direction, images without blurring can be obtained in all frames successively taken while panning the camera 500. In other words, while it is difficult for the optical filter 100 in the first embodiment to make a blurring correction because the optical axis displacement occurs in the same direction as the panning direction of the camera 500 at the filter rotation angle +90° to −90°, images can successively be obtained without blurring without inter-frame thinning because the optical axis displacement occurs in the same direction all the time in the optical filter 300.

When 360° panorama images should be captured, it is possible to continue to capture images without blurring at each predetermined angle if a camera is continued to rotate at a fixed speed like lighting of a lighthouse. Also when a camera is mounted on a mobile unit such as a vehicle to captures images outside, images without blurring can successively be acquired by synchronizing the filter rotation speed with the speed of the mobile unit.

3. Third Embodiment

In the third embodiment, an example of a method of suppressing camera movement when images are captured by a camera in a hand or on a shoulder or an example of a method of suppressing camera movement caused by a structure vibration due to a wind or the like when a surveillance camera or the like is fixed and installed on a structure will be described. The optical axis deflection angle to suppress movement when a camera is held in a hand is generally considered to be about 0.014° for rather small movement, about 0.028° for rather large movement, and about 0.056° for very large movement. For a super-telephoto surveillance camera whose horizontal angle of view is 1° or less, there is an example in which the optical axis deflection angle to suppress movement is set to about 0.02°. The optical axis deflection angle necessary when images are captured by holding a camera in a hand or putting a camera on a shoulder or a surveillance camera or the like is fixed and installed on a structure can also be considered to be generally 0.1° or less.

Figure 15:
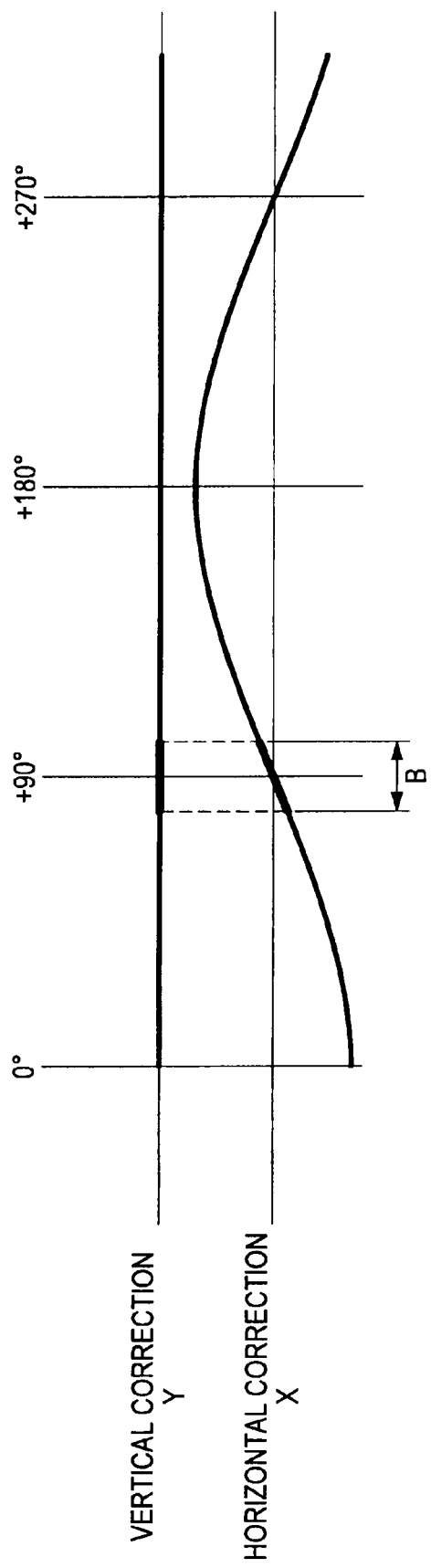
FIG. 15 is a characteristic chart illustrating a blurring correcting method according to a third embodiment.

In the third embodiment, movement corrections are made based on these values by causing filters to reciprocate and rotate. FIG. 15 is a characteristic chart illustrating a blurring correcting method according to the third embodiment. Like FIG. 4 in the first embodiment, when the filter 102 and the filter 110 are driven, the filters are controlled so that the filter 102 and the filter 110 reciprocate within a region B in FIG. 15 by setting the region B as a correction range of camera movement. Then, a movement correction of a microscopic angle, for example, 0.1° or less is made by the reciprocation driving. If a movement correction is necessary in the vertical direction, as well as in the horizontal direction, one more unit of the optical filter 100 configured in the same manner is set up before the lens so that a light beam that has passed through two units of the optical filter 100 enters the taking lens 124. In such a case, one unit of the optical filter 100 makes a movement correction in the horizontal direction and the other unit of the optical filter 100 makes a movement correction in the vertical direction and thus, the two units are arranged with a 90° difference of directions of action of light beam refraction.

4. Configuration Example in which Filters are Caused to Rotate

Figure 16:
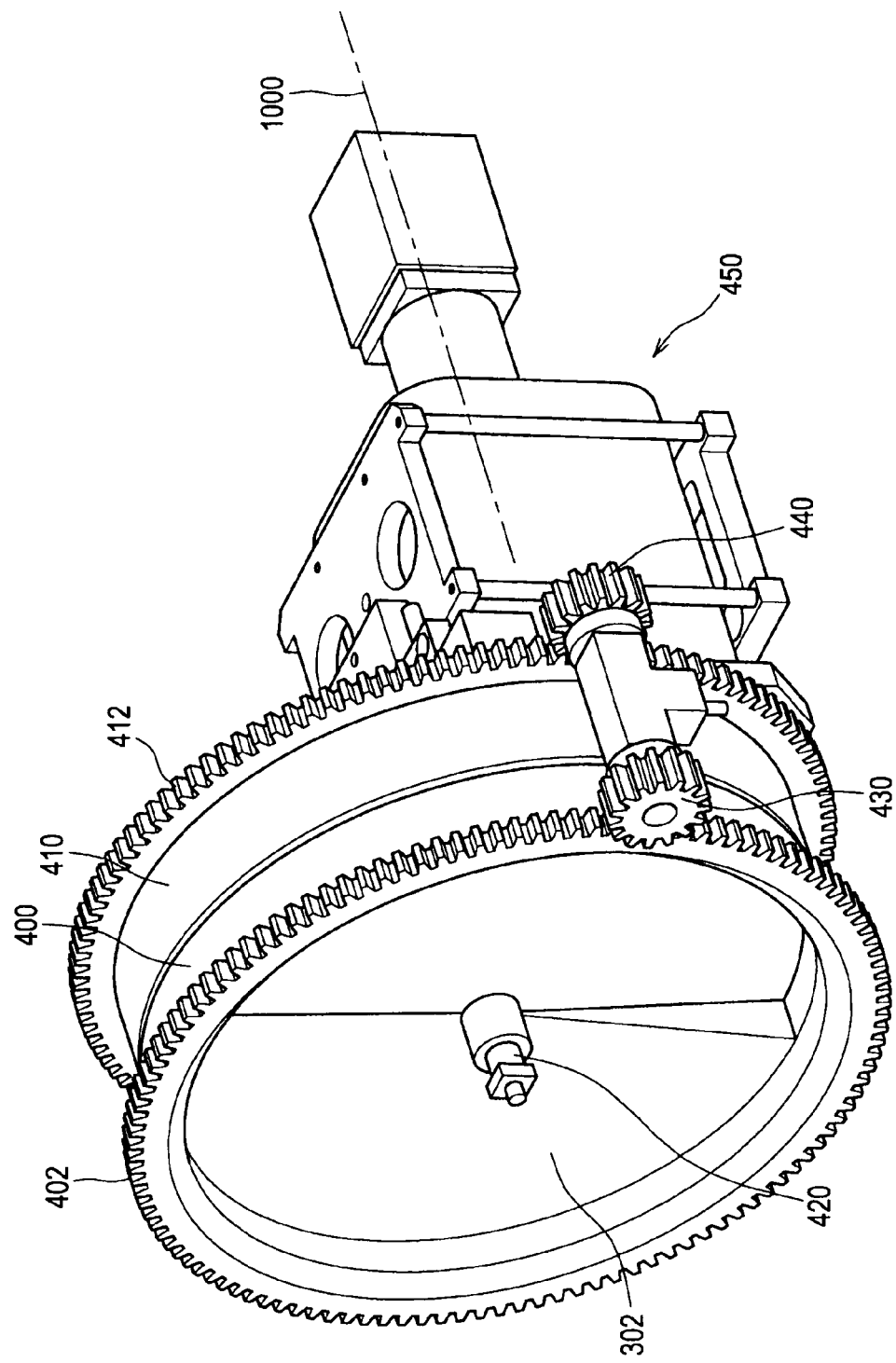
FIG. 16 is a schematic diagram showing a drive mechanism of an optical filter according to the second embodiment.
Figure 17:
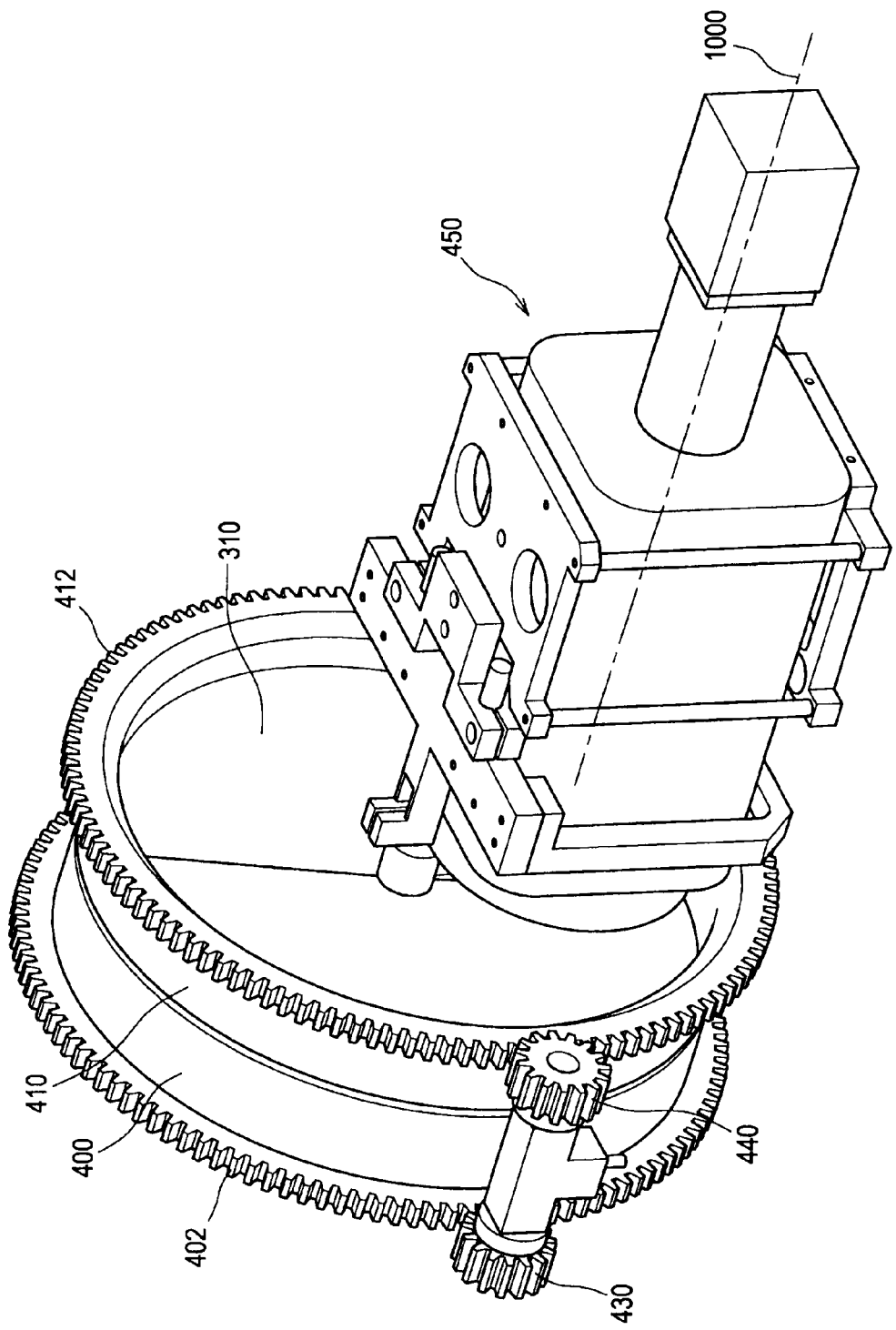
FIG. 17 is a schematic diagram showing the drive mechanism of the optical filter according to the second embodiment.

Next, a concrete configuration to rotate the filter 302 and the filter 310 of the optical filter 300 in a camera including the optical filter 300, the taking lens 124, and the image sensor 123 described above will be described. FIGS. 16 and 17 are schematic diagrams showing, as an example, a drive mechanism and the taking lens 124 of the optical filter 300 according to the second embodiment. As shown in FIGS. 16 and 17, the filter 302 of the optical filter 300 is put into a holding frame 400. Likewise, the filter 310 is put into a holding frame 410. The filter 302 and the filter 310 are cut through by a shaft 420 in the position of the rotation axis 1100 and are made rotatable around the shaft 420. A gear 402 is provided on an outer circumference of the holding frame 400 and a gear 412 is provided on the outer circumference of the holding frame 410. A gear 430 engages with the gear 402 and a gear 440 engages with the gear 412. A photographing unit 450 includes the taking lens 124 and the image sensor 123 and the optical axis 1000 of the taking lens 124 is offset by a predetermined amount with respect to the shaft 420.

In the configuration described above, driving from a motor (not shown) is transmitted to the gear 430 and the gear 440 to rotate in directions opposite to each other. In this case, by inserting one idle gear between the gear 430 and the gear 440, the gear 430 and the gear 440 can be rotated at the same speed in the opposite directions by one motor. Accordingly, a driving force is transmitted from the gear 430 to the gear 402 and also from the gear 440 to the gear 412 so that the filter 302 held by the holding frame 400 and the filter 310 held by the holding frame 410 rotate in directions opposite to each other.

Figure 18:
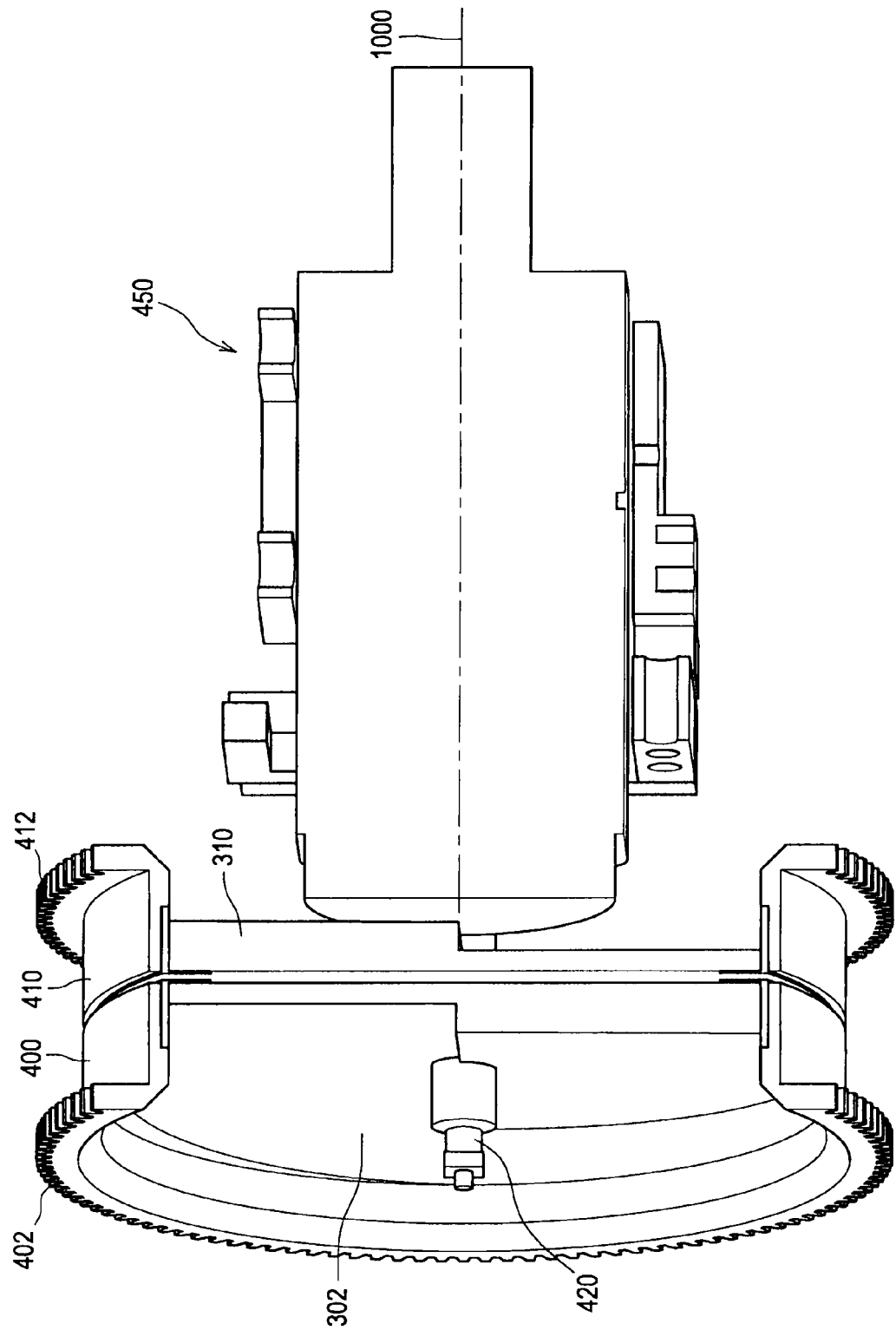
FIG. 18 is a schematic diagram showing the filter as a sectional view in the drive mechanism of the optical filter.
Figure 19:
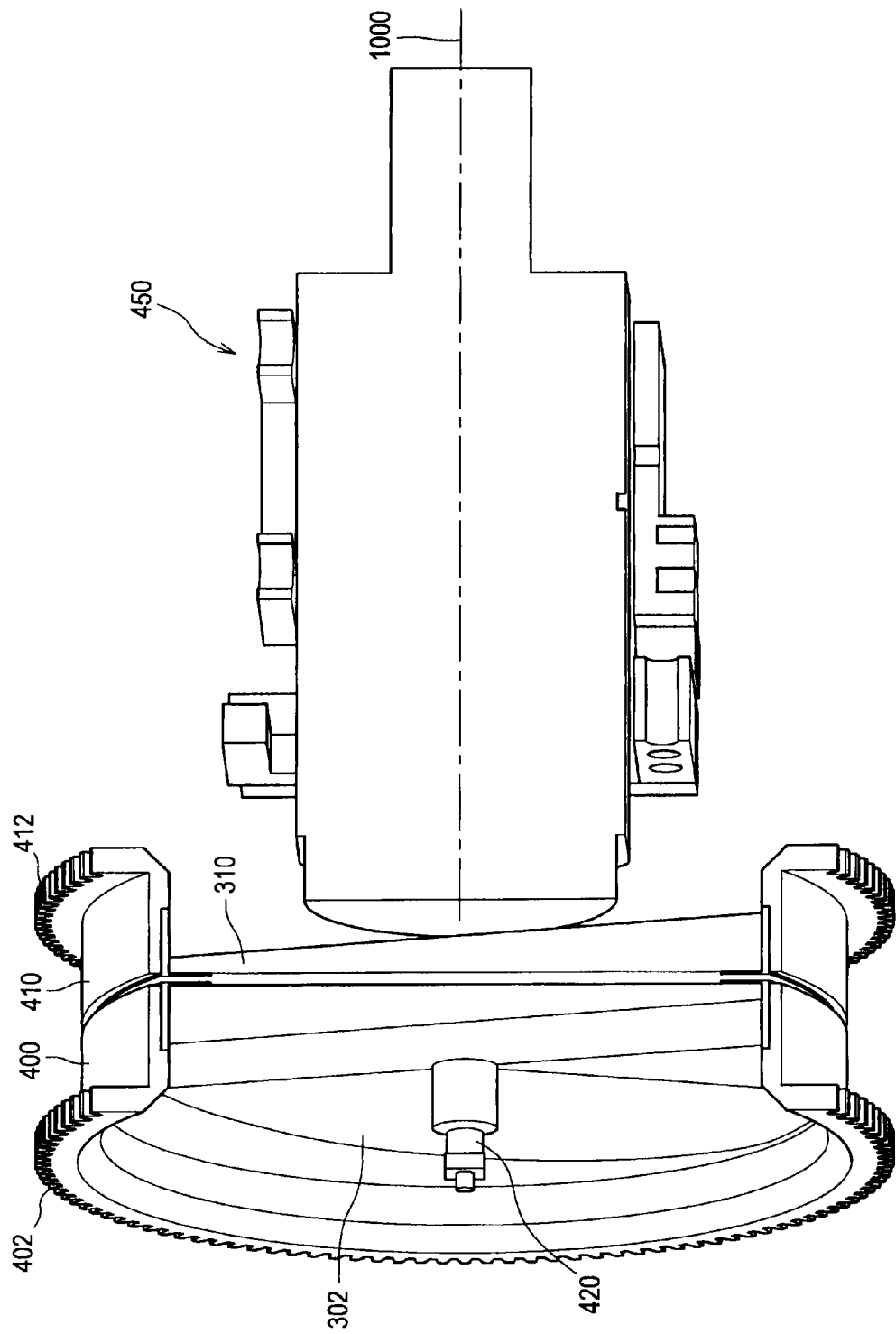
FIG. 19 is a schematic diagram showing the filter as a sectional view in the drive mechanism of the optical filter.

FIGS. 18 and 19 show the filter 302 and the filter 310 as a sectional view and FIG. 18 shows a state when the filter 302 and the filter 310 are viewed from the plus side in the X direction in the 0° position. FIG. 19 shows a state when the filter 302 and the filter 310 are viewed from the plus side in the X direction in the 90° position.

When the optical filter 100 according to the first embodiment is configured, the filter 102 is held by the holding frame 400 and the filter 110 by the holding frame 410. Then, the optical filter 100 can be configured by rotatably holding the outer circumference of the holding frame 400 and the holding frame 410 without providing the shaft 420 in the rotation center. Also in this case, the filter 102 and the filter 110 can be rotated in the opposite directions by transmission of a driving force from the gears 430 and 440.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST 100, 300 Optical unit
102, 110, 302, 310 Filter 105, 106, 115, 116, 305, 306, 315, 316 Surface
123 Image sensor
124 Taking lens
500 Camera

The invention claimed is:

1. An optical apparatus comprising:
a first optical element that includes a first surface intersecting a rotation axis at a predetermined angle and a second surface orthogonal to the rotation axis and rotates around the rotation axis; and
a second optical element that is arranged adjacent to the first optical element, includes a third surface and a fourth surface in a spatial relationship of point-symmetry to the first surface and the second surface about a point on the rotation axis between the first optical element and the second optical element, respectively, and rotates around the rotation axis in an opposite direction of the first optical element, wherein
point-symmetry is defined when objects have a same distance from a central point on the rotation axis but in the opposite direction.

2. The optical apparatus according to claim 1,
wherein the first surface is formed of two surfaces whose orientation of inclination with respect to the rotation axis is reversed in a boundary surface including the rotation axis, and
the fourth surface in the spatial relationship of point-symmetry to the first surface about the point on the rotation axis is formed of two surfaces in the spatial relationship of point-symmetry to the two surfaces of the first surface about the point on the rotation axis.

3. The optical apparatus according to claim 1,
wherein the first and second optical elements make a reciprocating motion about the rotation axis within a range of a predetermined rotation angle.

4. The optical apparatus according to claim 1,
wherein the optical apparatus is arranged on an object side of a taking lens to form an object image in a state in which an optical axis of the taking lens and the rotation axis are matched to allow a light beam that has passed through the first and second optical elements to enter the taking lens.

5. The optical apparatus according to claim 2,
wherein the optical apparatus is arranged on an object side of a taking lens to form an object image in a state in which an optical axis of the taking lens and the rotation axis are offset to allow a light beam that has passed through the first and second optical elements to enter the taking lens.

6. The optical apparatus according to claim 1,
wherein the optical apparatus is arranged on an object side of a taking lens to form an object image and a period in which the taking lens captures an image for each frame while moving and a rotation period of the first and second optical elements are synchronized.

7. The optical apparatus according to claim 1,
wherein the optical apparatus is arranged on an object side of a taking lens to form an object image and a period in which the taking lens captures an image for each frame while rotating an orientation of an optical axis and a rotation period of the first and second optical elements are synchronized.

8. The optical apparatus according to claim 2,
wherein the optical apparatus is arranged on an object side of a taking lens to form an object image, a period in which the taking lens captures an image for each frame while rotating an orientation of an optical axis and a rotation period of the first and second optical elements are synchronized, and an amount of change of the orientation of the optical axis for each frame of the taking lens matches a light beam deflection amount when the first and second optical elements rotate by 180°.

9. The optical apparatus according to claim 1,
wherein the optical apparatus is arranged in front of a taking lens on an object side to form an object image, behind the taking lens on an image forming surface side, or inside the taking lens.

10. An imaging apparatus comprising:
an optical element including:
a first optical element that includes a first surface intersecting a rotation axis at a predetermined angle and a second surface orthogonal to the rotation axis and rotates around the rotation axis; and
a second optical element that is arranged adjacent to the first optical element, includes a third surface and a fourth surface in a spatial relationship of point-symmetry to the first surface and the second surface about a point on the rotation axis between the first optical element and the second optical element, respectively, and rotates around the rotation axis in an opposite direction of the first optical element;
a taking lens to form an object image by a light beam that has passed through the optical element; and
an image sensor having an imaging surface on which the object image is formed by the taking lens, wherein
point-symmetry is defined when objects have a same distance from a central point on the rotation axis but in the opposite direction.

11. The imaging apparatus according to claim 10,
wherein the first surface of the first optical element is formed of two surfaces whose orientation of inclination with respect to the rotation axis is reversed in a boundary surface including the rotation axis, and
the fourth surface in the spatial relationship of point-symmetry to the first surface about the point on the rotation axis is formed of two surfaces in the spatial relationship of point-symmetry to the two surfaces of the first surface about the point on the rotation axis.

12. The imaging apparatus according to claim 10,
wherein the first and second optical elements make a reciprocating motion about the rotation axis within a range of a predetermined rotation angle.

13. The imaging apparatus according to claim 10,
wherein an optical axis of the taking lens and the rotation axis are matched.

14. The imaging apparatus according to claim 11,
wherein an optical axis of the taking lens and the rotation axis are offset.

15. The imaging apparatus according to claim 10,
wherein an image of an object is captured for each frame while moving and a period in which the image is captured for the each frame and a rotation period of the first and second optical elements are synchronized.

16. The imaging apparatus according to claim 10,
wherein an image of an object is captured for each frame while rotating an orientation of an optical axis of the taking lens, and a period in which the image is captured for the each frame and a rotation period of the first and second optical elements are synchronized.

17. The imaging apparatus according to claim 11,
wherein an image of an object is captured for each frame while rotating an orientation of an optical axis of the taking lens and an amount of change of the orientation of the optical axis for each frame matches a light beam deflection amount when the first and second optical elements rotate by 180°.

\* \* \* \* \*